Nov. 3, 1953             E. B. PEASE             2,657,927
FISH DISPLAY
Filed March 31, 1950
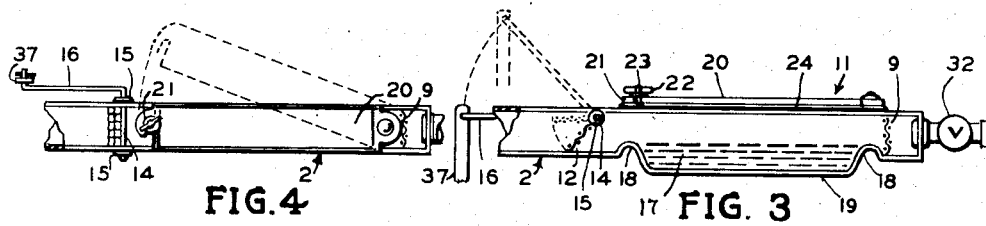
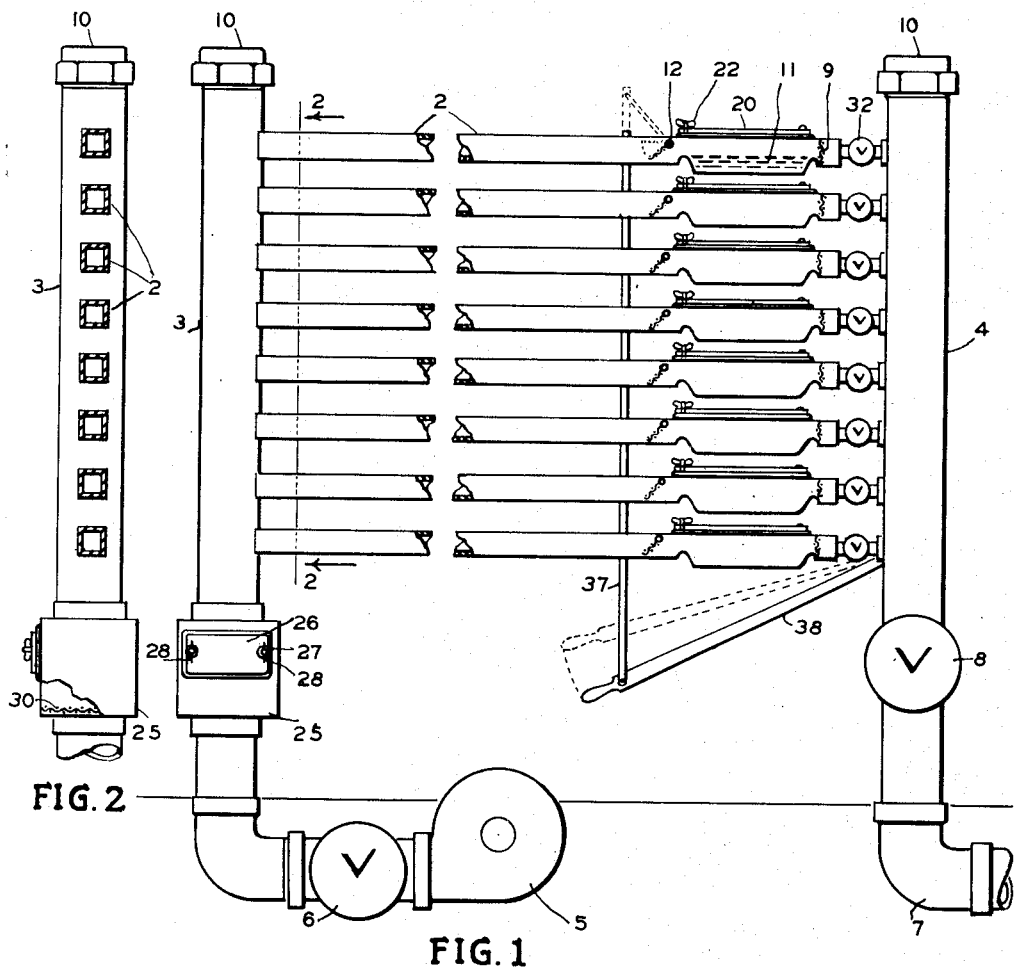
EDGAR B. PEASE    Inventor
By Scott L. Norvell
Attorney Patented Nov. 3, 1953

2,657,927

UNITED STATES PATENT OFFICE 2,657,927

FISH DISPLAY

Edgar B. Pease, Phoenix, Ariz.

Application March 31, 1950, Serial No. 153,115

5 Claims. (Cl. 272—4)

This invention pertains to fish displays for studying and observing the action of fish with reference to water flow, which is artificially produced and controlled.

One of the objects is to provide a display having long transparent tubes in which fish may be detained for a determined time at one end while water is flowed from the opposite end at a predetermined controlled velocity;

Another object is to provide a vertical bank of transparent tubes with means for flowing water therethrough at a predetermined controlled rate, and with mechanism for introducing and confining fish in one end of said tubes and for releasing them from said confinement in all tubes at a determined time so they will be free to swim toward the other end of said tube;

Further objects concern the provision of mechanism for collecting and removing the fish after they have been released, as aforesaid, and for maintaining the fish in sufficient water in portions of the tubes before the water flow is turned on, and after the fish have been released, to avoid injuring them.

Other objects will appear hereinafter.

I attain the foregoing objects by means of the apparatus and devices illustrated in the accompanying drawings in which—

Figure 1 is a front elevational view of fish display apparatus incorporating my improvements and devices;

Figure 2 is a sectional elevation thereof taken substantially in line 2—2, of Figure 1;

Figure 3 is a side elevation of the starting end portion of one of the tubes, drawn on an enlarged scale; and Figure 4 is a plan view of the same tube portion shown in Figure 3.

In the drawings numeral 2 indicates square fish display tubes made of clear transparent material. In Figure 1, the central portion of these tubes is shown broken out to indicate that they may be of any desired length. These tubes are disposed horizontally and are inserted at the ends in somewhat larger vertical pipes or headers 3 and 4. Pipe 3 being at the left end of tubes 2 as shown in Figure 1, is connected at its bottom to a water pump 5 and flow of water from this pump is controlled by valve 6. It is to be understood that pump 5 is connected to a water supply (not shown) which is adequate for the purposes here concerned.

The bottom of header 4 is connected to a disposal drain 7, and flow into the drain is controlled by valve 8. Pipe 3 may be termed the inlet header, and pipe 4 the outlet header. Both pipes are closed at the top by caps 10.

Adjacent the outlet header portions of tubes 2 are constructed to act as fish cages 11. These cages each include an outer screen barrier 9 which is adjacent the outlet end of each tube, and an inner hinged barrier gate 12 positioned at the inner end of the cage portion 10. The bottom of the tubes within the cage portion has a flat bottomed depression 19 bounded by two raised portions 18 at each end to form a waiting pool 17. This pool retains enough water to accommodate a fish even though there may be no water in or flowing through the remainder of the tube.

Barrier gates 12 are made of a heavy screen shaped to block the tube when vertical and are supported at the top on a shaft 14 which extends transversely relative to the length of the tube. Shafts 14 are sealed into the tubes 2 by gaskets 15 to afford a water tight joint permitting rotation of the shaft. Each shaft has a crank 16 formed on one end. These cranks are all joined to a link bar 37. This bar may be operated by any convenient mechanism such as the operative handle 38. By this mechanism it is possible to open all the gates 12 at the same instant.

Above depression 19 in each tube 2, there is a hinged plate 20 which constitutes a cage door. These plates are sealed by a rubber gasket 24, and provided with means for sealing water tight including end hooks 21 which engage studs 23 set in the top wall of the tube and provided with wing nuts 22.

On the bottom of header 3 there is a rescue trap 25 equipped with an access door 26 which may be sealed water tight by gasket 27 and held by wing bolts 28. A screen 30 positioned in the bottom of this trap, prevents fish from swimming past the trap and into pipe 31 leading from pump 6.

In use water is first pumped through all display tubes 2 sufficient to fill the waiting pools 17. Flow regulating valves 32 are then adjusted so that water flow through tubes 2 is evenly proportioned. Inlet valve 6 and outlet valve 7 are each adjusted to provide the desired velocity of flow. Pump 5 is then stopped and doors 20 opened, one at a time, and a fish placed in the waiting pool 17 below the opened door. All gates 12 are closed and rescue trap door 26 is closed.

When the desired number of fish to be displayed have been introduced into the waiting pools of the several display tubes 2, pump 5 is again started and water evenly flowed through the display tubes. When full velocity of flow has been attained all barrier gates 12 are opened by movement of lever 38 as shown by dotted outline. Since certain fish normally tend to swim against the current (flow) these fish will leave the waiting pools 17 and swim through the tubes 2 where they can be observed and their swimming action studied. The fish eventually enter header 3 and descend into trap 25. After pump 5 is stopped trap door 26 is opened and the fish collected removed.

From the foregoing it will be understood that I have provided a device by which the movements and speed of fish may be adequately observed, studied, and compared. Under certain conditions the device is suitable for racing fish to compare their speeds and behavior in swimming against the flow of water at considerable speed. I have also provided means for safely and humanely handling and recovering the fish after each test swim. The display tubes 2, arranged as shown, may be of any desired size or length and lighted both from the front and the back.

Aside from the purposes here stated, many other uses will suggest themselves to those familiar with the art. Therefore, I wish to be limited only by the claims.

I claim:

1. A fish display, including in combination, a plurality of parallel transparent display tubes; a vertical inlet header attached to one end of each of said tubes; a vertical outlet header at the other end of said tubes; means operatively connected with one of said headers for providing a flow of water at a predetermined velocity from said inlet header, through said display tubes, to said outlet header; a fish cage having a barrier gate at its inlet end, a waiting pool, a screen at its outlet end and an access door formed in each display tube adjacent its outlet end; a fish recovery trap, including a water tight box, an access door thereto, and a screen at its outer end, positioned in the lower inlet end of said inlet header; and lever means connected to said barrier gates for operating the barrier gates of the fish cages in said tubes in unison.

2. A fish display for racing and observing swimming movements of fish including, a vertical bank of horizontally disposed transparent display tubes; a vertical inlet header joining said display tubes at their inlet ends; a vertical outlet header joining said tubes at their outlet ends; cages in said tubes for detaining fish to be displayed therein, adjacent the outlet ends of said tubes, each cage comprising a waiting pool formed by a depression in the bottom of the tube and adapted to retain enough water to swim a fish to be displayed, a watertight access door at the top of each tube above the waiting pool therein; a barrier screen at the outlet end of said tube; a hinged barrier gate at the inlet end of said cage; a lever and link connected to said barrier gates for operating all hinged barrier gates in unison, means, including control valves, for flowing water through said display tubes when desired at a predetermined velocity from said inlet header to said outlet header, and a fish recovery trap in the inlet end of said inlet header.

3. In a fish display for observing swimming movements of fish, having an inlet header and an outlet header and means operatively connected with said inlet header for supplying water at predetermined pressure and means operatively connected with said outlet header for disposing of said water, the combination therewith of a vertical bank of horizontally disposed transparent fish display tubes adapted to receive water from said supply at one end and connected to said disposal at the other end, each tube having a fish cage including a screen on the outlet side thereof, a screen barrier gate on the inlet side thereof and a waiting pool adapted to retain water to swim a fish therein independent of the water flowing through said tube.

4. A fish display for observing the swimming of fish counter to the flow of water, including in combination, a vertical inlet header, a vertical outlet header, having a pipe for disposal of water outflow, a plurality of parallel horizontally extending vertically spaced transparent display tubes connected to said headers in fluid tight relation therewith, a pump connected to said inlet header arranged to supply a rapid flow of water from said inlet header thru said display tubes to said outlet header, so that the velocity of flow through said tubes is the same, fish barrier screens at the outlet ends of each display tube, a depression formed in the bottom of each display tube, near its outlet end, forming space for a waiting pool below the level of the bottom of said tube, and containing sufficient water to enable a fish to swim independently of water flowing thru said display tubes, an opening in the top of each tube over the waiting pool therein, a screen gate within each of said tubes disposed at the inlet end of said waiting pool, supported on a transverse shaft extending outward from said tube in water tight relation thereto and having a crank at its outer end; a link connecting the cranks of all shafts operated by a lever so that all gates may be opened or closed in unison; a water tight door closing the opening in the top of each tube directly above the waiting pool therein; and a rescue trap in said inlet header below the bottommost display tube including a barrier screen and an access door.

5. In a fish display for observing swimming movements and speed of fish, including a vertical inlet header, a vertical outlet header, a vertical bank of transparent display tubes connected therebetween, a pump operatively connected with said inlet header and arranged to supply water to said inlet header in quantities to fill and flow thru said display tubes, the combination therewith, of a fish cage formed within the outlet end portion of each display tube including a screen barrier on the outlet end of the tube, a movable barrier gate at the inlet end of said cage portion, a depression in the bottom of said tube holding sufficient water below the bottom of the tube to form a waiting pool and enable a fish to swim independently of the flow of water thru said tube, and a water tight door in the top of said tube above said waiting pool to enable the user to place a fish in said waiting pool when water is not flowing thru the display tube.

EDGAR B. PEASE.

References Cited in the file of this patent

UNITED STATES PATENTS

| Number | Name | Date |
| --- | --- | --- |
| 2,117,616 | Levenstein | May 17, 1938 |
| 2,330,899 | Levenstein | Oct. 5, 1943 |
| 2,524,906 | Groh | Oct. 10, 1950 |